United States Patent [19]

Bialek

[11] 3,757,037

[45] Sept. 4, 1973

[54] VIDEO IMAGE RETRIEVAL CATALOG SYSTEM

[76] Inventor: Norman Bialek, 14 Broadview Rd., Westport, Conn.

[22] Filed: Feb. 2, 1972

[21] Appl. No.: 222,746

[52] U.S. Cl. ........................ 178/6.6 A, 35/8, 178/18, 178/6.7, 340/324 A, 340/365

[51] Int. Cl. ............................................ H04n 1/10

[58] Field of Search ..................... 178/6.6 A, 6.7 R, 178/18, 19, 20; 353/25, 26, 27; 340/324 A, 324 AD, 365 S; 35/5, 6, 8

[56] References Cited

UNITED STATES PATENTS

| | | | |
|---|---|---|---|
| 3,292,489 | 12/1966 | Johnson et al. | 353/25 |
| 3,612,676 | 12/1971 | Ooba et al. | 353/27 |

*Primary Examiner*—James W. Moffitt
*Attorney*—H. Gibner Lehmann

[57] ABSTRACT

An image retrieval is provided for displaying any selected image stored on a tape cassette or cartridge, which may be a video tape, a photographic film tape, etc., using available display equipment, by keying, on a simple numerical keyboard, index numbers which indicate successively finer categories of subject matter until the desired item (or small group of items) is displayed, or alternatively, selecting any one of these items if its code number is known. Means are provided for selectively advancing or backing up the displays for a desired examination, and for rapid visual display scanning of any series of successive stored images.

14 Claims, 15 Drawing Figures

FIG. 4

Main Index Image
0 Home Maint. & Improv.
1 Clothing
2 Home Furnish. & Appls.
3 Office Equipt. & Supplies
4 Farm, Garden Equipt. & Supplies
5 Home Entertainment, Hobbies, Toys
6 Sports, Vacation, Travel Equipt.
7 Automotive Accessories
8 Foods, Drugs, Cosmetics, Pers. Appl.
9 Other

FIG. 7

Index Image 274
0 Sears
1 G.E.
2 Whirlpool
3 Frigidaire
4 Philco
5
6
7
8
9

FIG. 5

Index Image 2
Home Furn. & Appls.
0 Furniture
1 Draperies, Fabrics
2 Carpeting, Floor Coverings
3 Table & Kitchen Wares
4 Bedroom Accessories
5 Bathroom Accessories
6 Nursery Needs
7 Major Appliances
8 Small Appliances
9 Other

FIG. 9

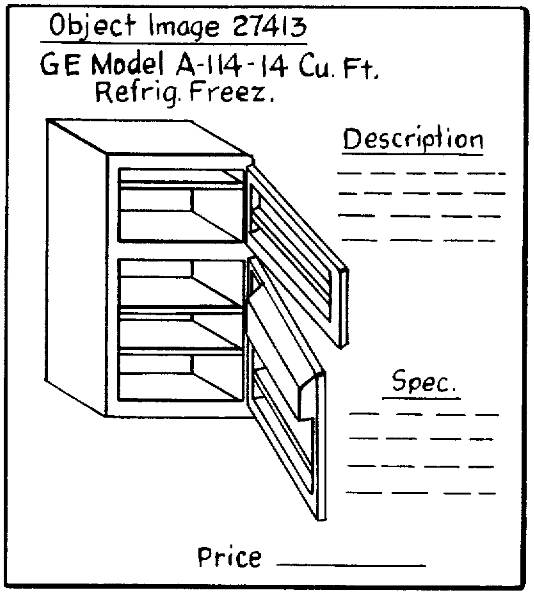

FIG. 6

Index Image 27
0 Ranges, Ovens
1 Dishwashers
2 Washing Machines
3 Dryers
4 Refrigerators
5 Freezers
6 Vacuum Cleaners
7 Disposalls, Trash Compactors
8 Sewing Machines
9 Other

FIG. 8

Index Image 2741
0 GE Model A-109 - 9 Cu. Ft. - Refrig - Freez.
1 " " A-111 - 11 " " - " "
2 " " B-111 - 11 " " - Deluxe Refrig - Freez.
3 " " A-114 - 14 " " - Refrig - Freez
4 " " B-114 - 14 " " - Deluxe Refrig - Freez.
5 " " A-117 - 17 " " - Refrig - Freez.
6 " " B-117 - 17 " " - Deluxe Refrig. - Freez.
7
8
9

VIDEO IMAGE RETRIEVAL CATALOG SYSTEM

No Cross References To Related Applications

BACKGROUND

Heretofore in the retrieval of information from computers it was the usual procedure to accumulate the data in the form of individual characters or "bits," which after being located were assembled in a manner to recreate the total desired material. Usually, with computers, it has not been possible to precisely retrieve and display a reasonably large intact unit of information in the form of an unreconstituted, intact image, as for example an entire page of printed matter, or entire pictures covering a page or combinations thereof. Moreover, in the field of computers the equipment represents a large outlay of money, constituting an appreciable cost factor.

SUMMARY

The above disadvantages and drawbacks involved with the retrieval of information from computers and like equipment are obviated by this invention, and the main object of the invention is to provide a means for utilizing available video cassette tape storage devices for storing a large number of grouped items of information, and for retrieving said items to be displayed selectively. For example, the device may be used as a catalog somewhat similar to a well known mail order catalog such as that put out by Sears, Roebuck & Co. In the illustrative example which will be discussed now, it will be assumed that all of the subject matter in the catalog will be divided into ten categories, a more detailed example of which will be given below. It is further assumed that if the cassette stores 100,000 items of individual display data, that a five-track tape will be used, and that means are provided for scanning each track individually. The first track might then contain a main index image, and at widely spaced intervals along it a showing of each of the initial ten categories into which the subject matter is divided, for example, the first category identified by the numeral 0 might be "Home Maintenance and Improvement," and following it, item 1 might be "Clothing"; item 2, "Home Furnishings and Appliances," item 3, "Office Equipment and Supplies," and so forth, dowm to item 9, which could be a "Miscellaneous" category for items not covered by the other headings. Thus a person interested in office equipment might press key 3 of a small keyboard which will be described below, and the tape will be advanced at high speed during which each category that is passed is counted, until item 3 is reached, at which time the tape will stop and the display screen will display a list of ten sub-categories into which this category has been divided. The relevant sub-category will then be selected from this list, and the number (again from 0–9) by which it is identified, will be pressed on the keyboard, and this time the second track will be read or scanned until the selected item is reached, and the process continued on successive tracks until the most refined category is reached, which we may assume to be "desks," and which will provide a listing of up to ten individual desks. Any of these could now be examined by the operator pressing the appropriate button or key. If he wishes, he may backtrack or advance one frame at a time, so as to examine other comparable items, and in this way make his selection of the one which he desires.

In the above described manner, the cassette provides a catalog of up to 100,000 items in the example given, any of which may be selected by going successively from broader categories to finer sub-categories until the desired data can be reached and displayed individually. It will be understood that during the individual display, the video tape is being scanned in the conventional fashion such as is now common in the "instant replays" when the action is frozen and a particular frame displayed continuously. This, of course, requires a conventional video player and CRT screen such as commonly used for television display. It must have "freeze frame" capability that allows viewing of a still image. During the initial stages of the above-described process, the display at each stopped frame will be that of an index or list of up to ten categories, one of which can be selected as the relevant category for the item being sought. The last track will show instead picture information and/or a description of the object concerning which the data is being sought.

The specific nature of the invention, as well as other objects and advantages thereof, will clearly appear from a description of several embodiments as shown in the accompanying drawings, in which:

FIGS. 4–9 show the examples of respective indices showing successively five sub-categories of data in an examplary situation.

Figures 10, 11:
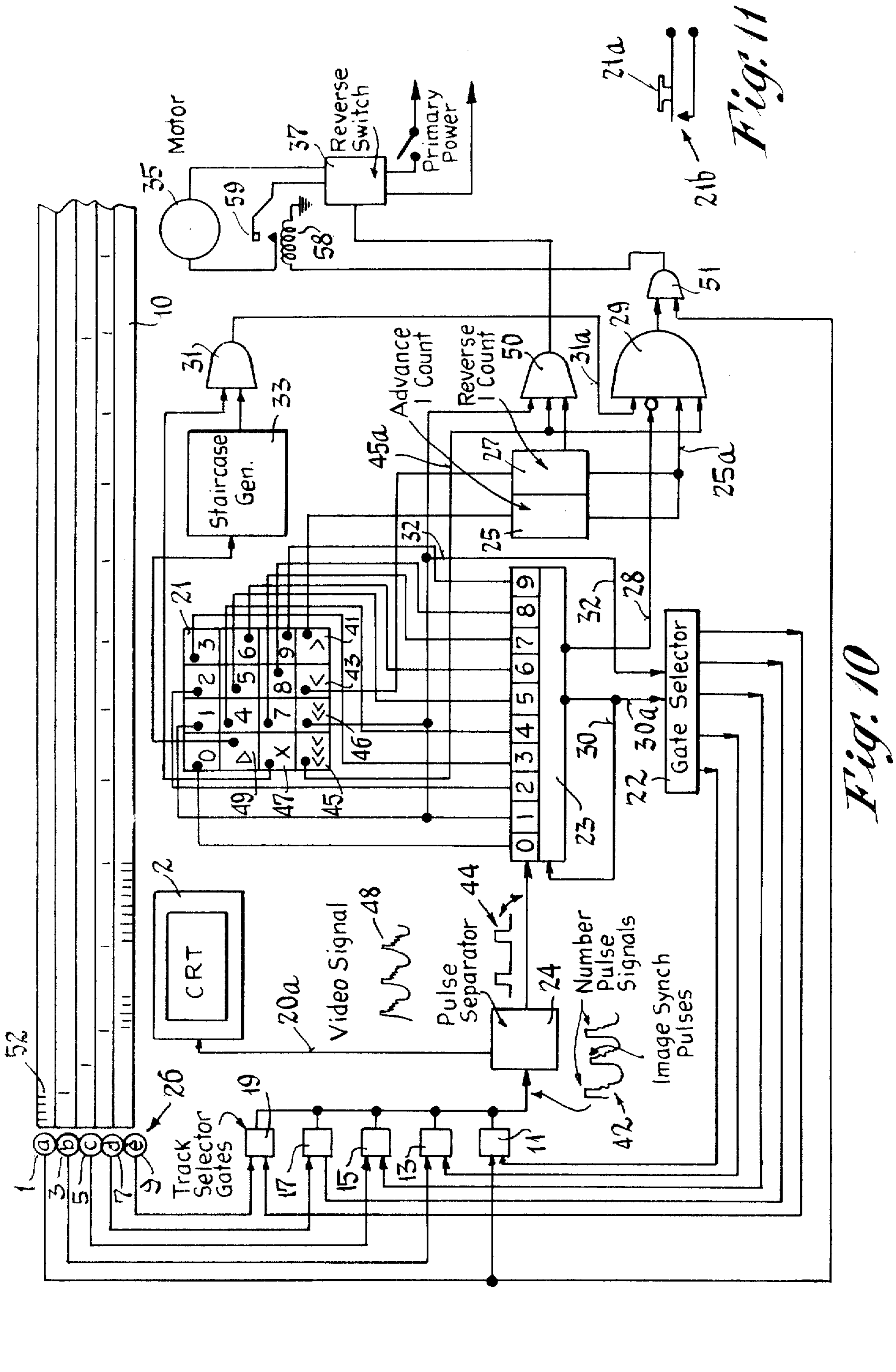
FIG. 10 is a schematic circuit diagram illustrating the operation of the system.

FIG. 11 diagrammatically shows one type of key switch, sixteen of which can be used in the manual control unit of the system.

Figure 12:
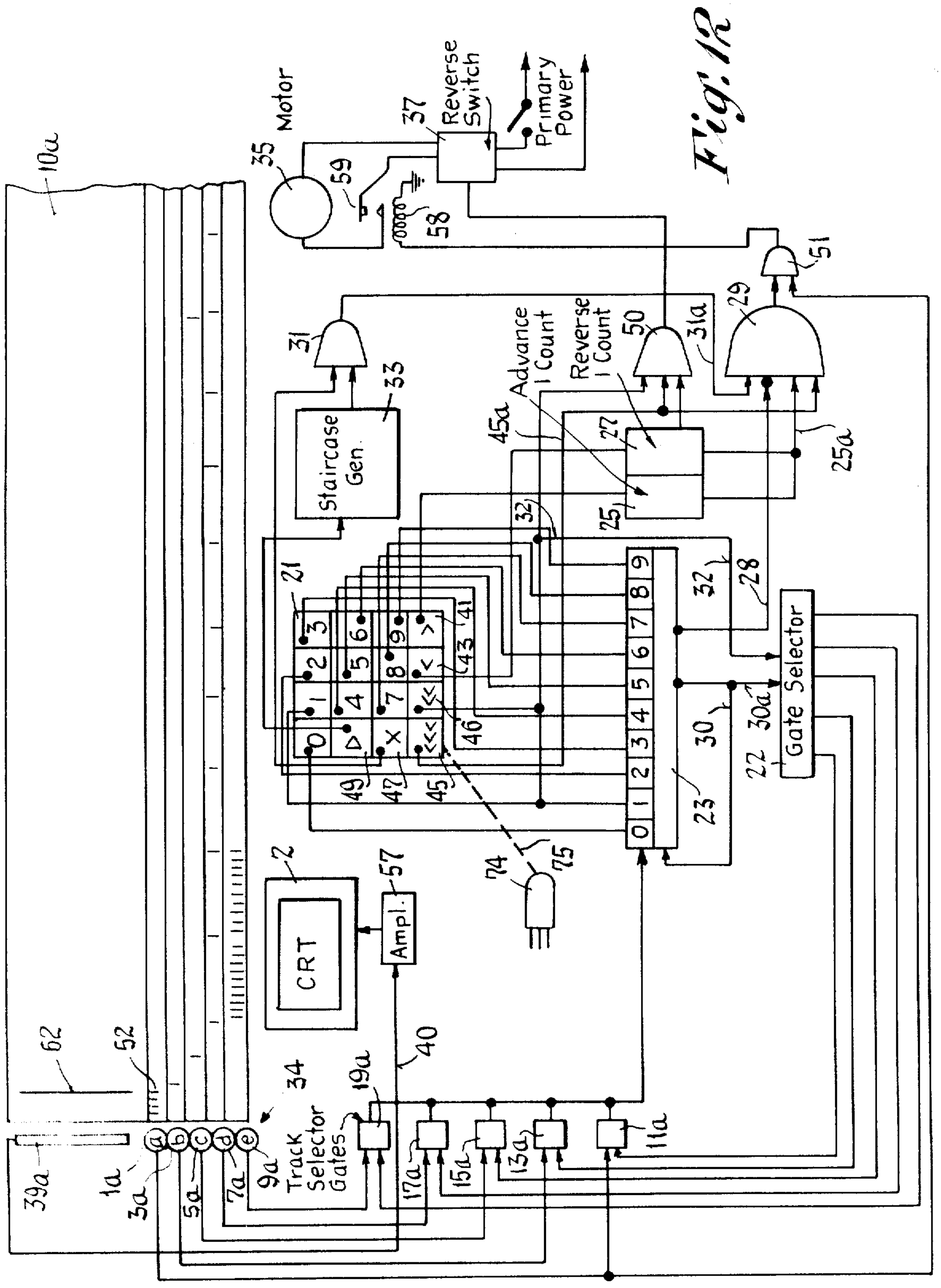

FIG. 12 is a schematic diagram of another embodiment of the invention, wherein the image data on the tape is placed in an area which is entirely separate from the pulse information on the tape.

Figure 13:
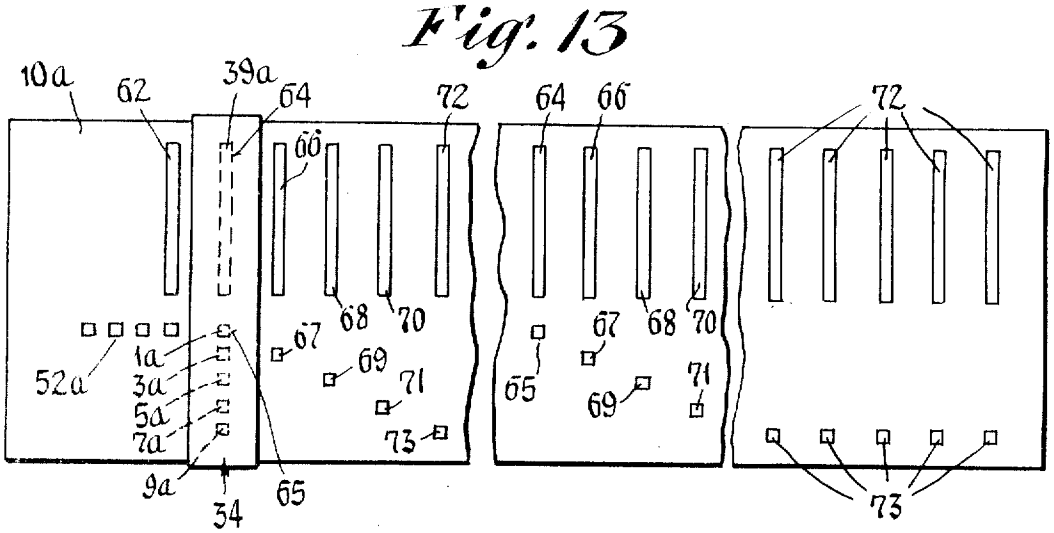

FIG. 13 is a diagrammatic representation of the tape of FIG. 12, showing one arrangement of video display information and the location of the code markers corresponding thereto.

Figure 14:
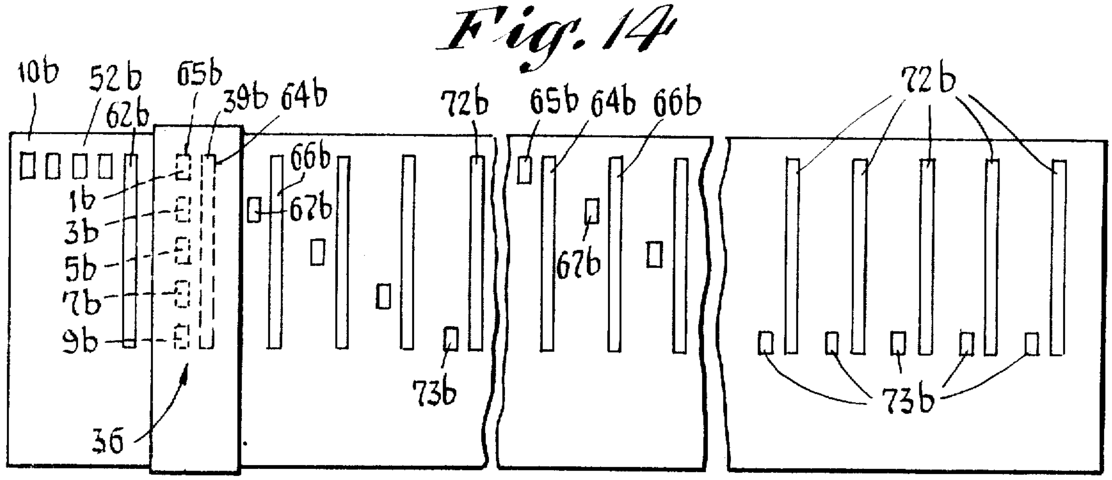

FIG. 14 is a view like that of FIG. 13, but showing another arrangement of video display information and the location of the code markers corresponding thereto.

Figure 15:
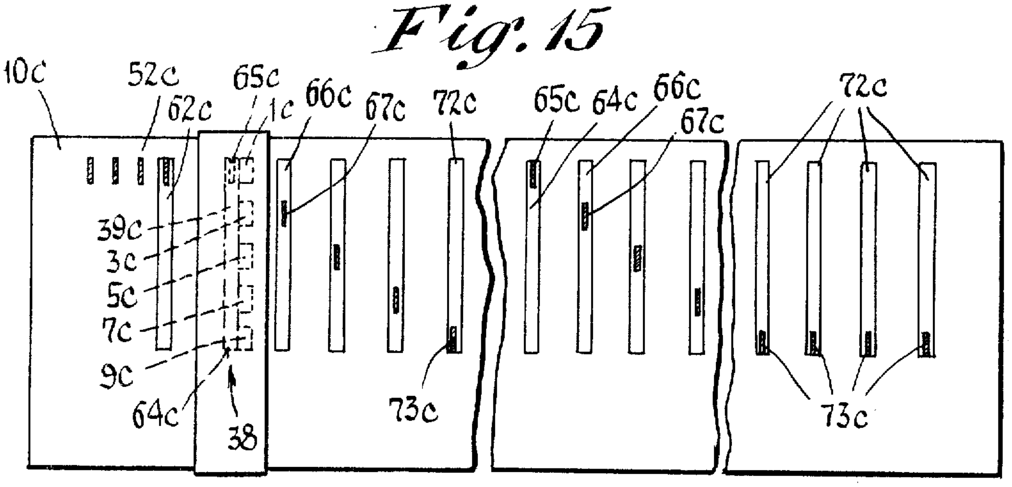

FIG. 15 is a view like that of FIGS. 13 and 14 but showing still another arrangement of video display information and the location of the code markers corresponding thereto.

The physical components of the system, shown by way of example, comprise a video player and CRT screen for playing video cassettes which are, especially prepared to contain recordings of substantive material for display, indexed in accordance with the image access code which will be described in more detail below. The tape preferably also includes recordings of each index image, by means of which the material in the following sub-indices may be selected. In addition to the above conventional equipment, there is also a special unit which controls the operation of the video tape and reads the data recorded on the successive tracks, and controls the ultimate display of the object images containing the desired information. The control device will have the capability for controlling the movement and stopping of the recorded medium, as will be described below. The images are recorded on a storage medium such as magnetic tape, but may also be placed on photographic film or any other video recording substance that is adaptable for use in cassette or reel form. An individual cassette may contain both object and index images, if an internal index is used. If instead, an external index is used, the entire cassette may be devoted to object images.

The invention will now be described, for a system using the example given in the preliminary discussion, that is, a mail-order type catalog, in which all categories are divided into ten subcategories, and each subcategory is further subdivided into ten more categories, and so forth.

Figures 1, 2:
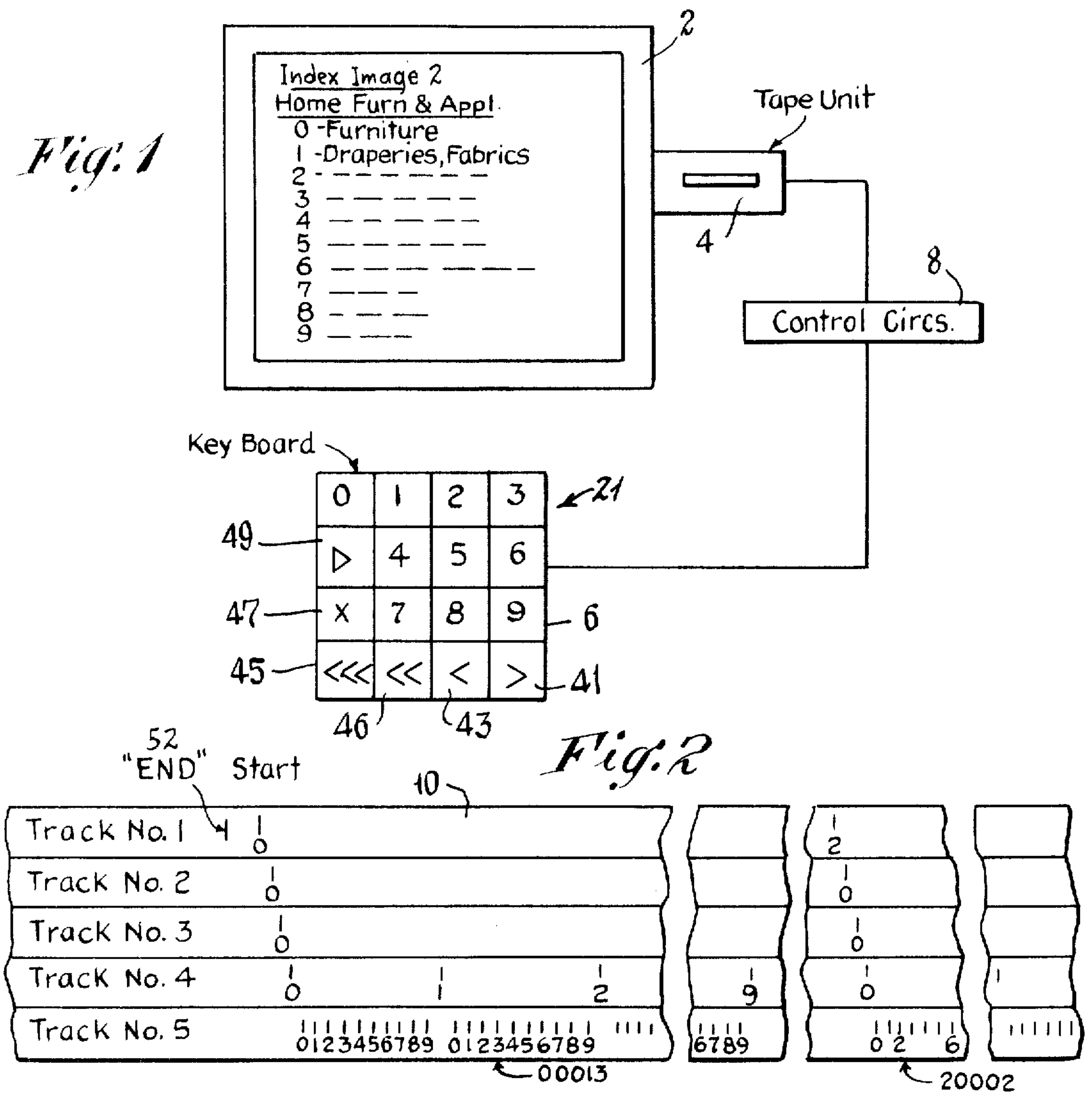
FIG. 1 is a schematic diagram showing the main elements of the system.
FIG. 2 is a view of the tape showing the manner in which code markers are arranged on the tape in five tracks, but without the display data record.

Referring to FIG. 1, the display unit 2 is indicated as a cathode ray device comprising a viewing screen adapted to display image data recorded on a tape cassette which is inserted into tape unit 4, which is in turn controlled by keyboard 6 through control circuit 8, as will be explained below.

Figure 3:
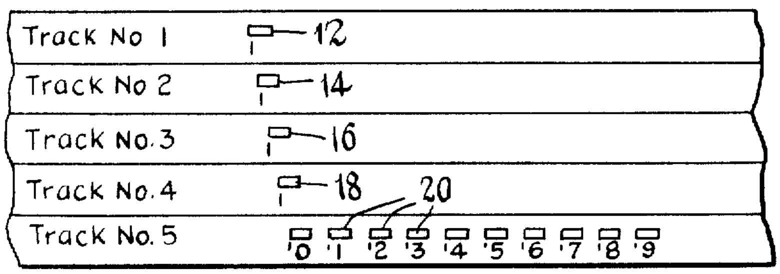
FIG. 3 is an enlarged view of a section of track showing one manner in which display data may be associated with each code marker.

A section of the tape 10, (hereinafter also referred to as a "video ribbon") including the initial section, is depicted in FIG. 2, which shows only the control pulses in order to indicate the relationship, but does not show the video image display recording areas, comprising display information, which are indicated in FIG. 3 at 12, 14, 16, 18 and 20 respectively, the tape in the present example being assumed to have five recording tracks, with a separate scanning head for each track. It will be understood that with each pulse (also hereinafter referred to as a code marker) indicated in FIG. 1, there is or may be an associated display, the pulses being only for the purpose of locating and identifying the associated display. In track 1 of FIG. 2, after an initial marker ("END") which may be used to locate the beginning of the tape, the first numerical pulse is marked "0" and serves to identify the first of ten displays which are numbered from 0–9, and are spaced uniformly along the entire length of track 1. These initial 10 displays may be the respective displays of the 10 major categories into which the subject matter is divided, as shown in FIG. 4 (Main Index Image). The subject matter of FIG. 4 can be printed on the cassette or on a data sheet associated with the cassette, although preferably it can instead be located at the beginning of the first track of the tape, and be related to the initial positioning marker ("END") on track 1; that is, when the cassette is inserted and advanced to the first positioning pulse, the index of FIG. 4 will be displayed. In such a case, track 1 will contain both the Main Index Image and sub-index images for each of the ten categories listed in the Main Index Image. For example, the user, consulting this index, will be assumed to be looking for a refrigerator, and will see from the index that this comes under category 2, "Home Furnishings and Appliances." He therefore presses key 2 of keyboard 6, (hereinafter also referred to as an operator 21 having a plurality of movable members, arranged for selective actuation) which causes the tape to move at high speed, with the scanning device part 1 (also hereinafter referred to as a part of a video retrieval means 26) of track 1 energized, until this scanner reaches the location of pulse 2 on track 1, where it stops, and shows on the screen the display associated with this pulse, which will be the display shown in FIG. 5, subdividing category 2 of the Main Index Image into ten further categories under "Home Furnishings." The means for doing this will be shown below. The user now sees that sub-category 7 of the Index Image 2, "Major Appliances" is the one in which he is interested, and he therefore now presses key 7 of keyboard 6. The tape again moves at high speed, with the scanner for the second track now active and counting off six pulses, as it passes the code markers corresponding to the various categories shown in FIG. 5, and when it comes to the seventh pulse, the tape again stops and displays the next sub-category under "Major Appliances," which is shown in FIG. 6, and where it will be seen that item 4 "Refrigerators" is the next category of interest. The operator therefore now presses key 4, and the tape again continues to advance at high speed until it reaches the fourth pulse on track 3, where the index image shown in FIG. 7 is displayed; this shows under five different categories various makes of refrigerators, assuming that these are all the different makes that are handled by Sears, Roebuck & Co. The operator now presses the key corresponding to the make in which he is interested. Assuming that he has pressed key 1 for GE, he will see a display on track 4 as shown in FIG. 8, of a general listing of various models of GE refrigerators. If he then finally selects category 3 of FIG. 8, he will come to the display on track 5 as shown in FIG. 9, which contains a visualization of the refrigerator, together with a detailed description of its specification and price. If he wishes to compare this with other models, keys 43 and 41 of keyboard 6 (FIG. 10) can be used respectively to advance or retract the display to adjacent images, so that he can look at one after another. Other keys, such as 45, 47 and 49, also have general control functions to facilitate examination of the respective displays, as will be explained in detail below. It will be understood that the keyboard of manual operator 21 is shown diagrammatically, having 16 squares. Each square is intended to diagrammatically represent a key or pushbutton and an asociated electrical switch, as illustrated in FIG. 11. In this figure one of the 16 key switches is diagrammatically shown, having a pushbutton or key (also called a movable member in some claims) labelled 21*a*, and having electrical contacts indicated by the numeral 21*b*.

FIG. 10 shows the manner in which the above-described control of the tape and display is achieved. It is assumed that the cassette has a capacity to contain 111,111 images. When used for producing a television picture, these displays are ordinarily scanned at the rate of 30 complete frames per second, in order to produce the desired effect of motion. For the present purpose however, it is desired to be able to freeze any selected frame so as to examine it individually as described above, and the mechanism for doing this is well understood in the art, and is not per se a part of the present invention. However, it is necessary to solve the problem of providing access to any desired frame identified by subject matter, by a special arrangement of code markers. For this purpose, in the example which is used above, a five-track tape is used as representing a compromise between speed and simplicity. There are ten main index categories on the first track, spaced at ten points along the entire length of the track, ten sub-index categories for each main index category, etc., so that each track has ten times as many items as the preceding one, and the last track contains all $10^5$ items serially spaced in groups of 10 or less. It would, of course, be possible to have more or less than 10 categories or sub-categories for each track, but by using in effect a decimal arrangement, it becomes possible to utilize a simple keyboard having only the 10 digit keys from 0–9 inclusive. In FIG. 10, the five tracks on tape 10 are scanned by a retrieval means 26 comprising five separate reading heads 1, 3, 5, 7 and 9, also labelled *a, b, c, d* and *e* respectively; in FIG. 10 only the pulses or code markers are shown, the displays such as 12, 14 . . . 20 of FIG. 3 are omitted for clarity. These heads *a* . . . *e* are connected through respective gates 11, 13 . . . 19 and a pulse separator 24, to a counter 23. The counter 23 (also hereinafter referred to as a "coupling means") comprises electronic circuitry including a counting device, for coupling the operator 21 with a selector means 22 to effect a selective actuation of the latter. The video retrieval means 26 are adapted to be traversed by and coact with said ribbon, said means being arranged to retrieve data therefrom and produce pulses from the code markers thereof. To retrieve a given image, the operator preses the appropriate numbered button for the category (out of 10 possible categories) in which the desired representation belongs. Assuming he has pressed 2, corresponding to the example given above, the gate 11 opens and allows the counter to begin counting pulses picked up by head *a*. It will be understood that initial actuation of any of the numbered buttons energizes gate 11 to the open condition, after which the successive energization of any numbered button steps the open gate along successively from 11 to 13 to 15, and so forth, by means of a gate selector 22, which acts like a stepping counter. In the appended claims, the gate selector 22 is in some cases referred to as a selector means which controls the conversion means comprising the units 11 . . . 19 and 24. By the selector means 22, date from the ribbon can be displayed on said screen 2. Every time the operative reading head has scanned a number of pulses on the moving tape corresponding to the pushbutton on the operator 21 which has just been depressed, a pulse is sent out by the counter 23 on line 30*a* to preset the next gate selector. The next time any of the numbered buttons is pressed, the gate selector then closes the open gate and opens the next gate, so that the reading head will now be reading on the next track. The push-button switches represented by the squares of the operator 21 comprise a means which is under the control of the movable members or keys, or rendering operative the counting device 23 to totalize code marker pulses picked up by the retrieval means *a, b, c, d* and *e*. The output of the gates 11 . . . 19 is fed to the counter 23 through a pulse separator 24 which filters the pulses from the video signal. This pulse separator is a circuit similar to the one used in conventional TV receivers. The gates 11 . . . 19 and the pulse separator 24 comprise a conversion means which are connected respectively to the parts of the retrieval means 26 for selectively displaying on said screen information retrieved by said retrieval means. It will be understood that the actual signal received from the active reading heads *a* . . . *e* is a composite signal 42, and includes both the pulses 44 shown in FIG. 10 which are fed to the counting device 23, and the image representation data of the display image associated with each pulse, that is, those represented for example at 12, 14 . . . 20 in FIG. 3, the image representation data 48 being fed to the viewing screen 2. However, the pulse signal is of considerably higher amplitude than the video signal, including its synchronizing pulses, as indicated by the graphical representation at 42, 44 and 48 in FIG. 10. Gates 11 . . . 19 are linear gates. A linear gate is similar to a single pole-single throw switch. Once the switch is closed, the outgoing signal is a direct replica of the incoming signal. This is necessary for these gates since they not only process the pulses for the retrieval operation, but also the video signal for the CRT to display the actual image associated with the pulse location, which in this case is usually a list similar to FIGS. 4 et seq. Since this has to be done with the normal scanning characteristics of a cathode ray tube, a band width of about 6 MHz is necessary for these gates. The pulse separator 24 is similar to a biased amplifier, which has its cutoff level at the maximum level of the video signal. It cuts the video signal and its synchronizing pulses out, and leaves the code marker pulses as shown at 44 to pass to the counter 23. The CRT 2 can be a convention television receiver, having the *r-f* input disabled. The video signal is fed to the CRT screen for display, on line 20*a*. A display picture will always be the one corresponding to the selected pulse on each particular track, since all other track gates are closed. Circuitry for performing stepping functions of this type is routine in the computer field and well within the skill of the circuit designer. It should be noted that the viewing screen 2 and operator 21 may be located remote from the remaining components of the system, with the signals carried thereto and therefrom, respectively, via transmission lines of various types as is well known in the art. This would enable a number of keyboards and screens to be conveniently located at various branches of a store or warehouse, with the remaining components of the system including the cassettes located at a depot remote therefrom.

Pressing any of the numerical keys also closes a start switch (not shown) which activates counter 23 for operation, and also opens gate 29, as well as opening the first of the series of gates 11 . . . 19. Gate 29 is a logic gate and is connected as an "Or" gate. If the signal from gate 25 or 27 on line 25*a* is high, or if the signal from gate 31 on line 31*a* is high, or if pushbutton 45 is pressed to produce a high signal on line 45*a*, the output of the gate is high. If the signal from line 28 is high, then the output of gate 29 will be low, as this is an inhibiting signal. Opening of the gate 29 means a high output signal. A high signal into the motor on-off relay 58 causes the tape motor 35 to start running and to advance the tape. The motor 35 is referred to in some of the claims as a powered drive means for advancing the ribbon or tape 10. Gate 51 is also an "Or" gate; if the signal from gate 29 is high, the output of gate 51 is high and the motor starts running and continues running until the output signal from gate 51 becomes low. The gates 29 and 51 comprise control means for activating the drive means 35 in response to operation of the coupling means 23, said control means including means responsive to traversal of a part of the retrieval means by a predetermined number of code markers on the rubbon 10, for automatically halting the ribbon after a predetermined extent of travel corresponding to the counting of a predetermined number of pulses.

Gate 50 is also an "Or" gate. If any of the three input signals are high, the output of gate 50 is high, and the direction of the motor is reversed. This happens when the operator presses key 43 in order to look at the preceding frame, key 45 in order to rewind, or key 46 in order to look at the preceding frame of the next higher category.

Gate 31 is also an "Or" gate. If the signal from the staircase generator 33 is high, the output is high, opening gate 29 and 51 and causing the motor to run. If the operator presses key 47 the output of gate 31 goes low, closing gate 29 and therefore gate 51, and stopping the motor.

When the motor starts running, the tape moves at high speed past the retrieval means or reading head, of which for example, only the portion indicated by the numeral 1 is initially effective, because only gate 11 is open; therefore a pulse is transmitted from gate 11 through pulse separator 24 to the counter 23 each time the retrieval means 26 picks up a pulse on track 1. Assuming that key 2 has been pressed, the tape is advanced rapidly to the 2 category on track 1 which contains code markers corresponding to the main categories. When the code marker corresponding to 2 category on track 1 is reached, gate 29 is closed by the pulse coming out of line 28 as previously described, which stops the motor 35 at the desired image corresponding to the 2 pulse, and displays on the screen the list of the next ten lower categories corresponding to that shown in FIG. 5, e.g., Index Image 2. It will be understood that the means for stopping a tape from high speed at a desired point are known in the art and not per se a part of the present invention, but such means will in general be used so that the tape may be run at practicable speeds.

The operator now selects, from the cathode tube display, the next finer category which includes his desired subject and again pushes the corresponding number of the keyboard ; in the example given, this is 7. This starts up the motor 35, now the portion of the retrieval means indicated by the numeral 3 picks up the pulses on its track 2 and steps the counter 23, which was reset by a pulse on line 30 when line 28 was activated, until the frame corresponding to the select number, for example 7, is reached, then the above-described action is repeated, that is, the motor steps, the counter is reset, and the next portion 5 of the retrieval means 26 is made effective, while the cathode ray tube displays the image of the next sub-category of information, as described above. It will be seen that each successive number selected corresponds to the next lower decimal order until the lowest category is reached. Similarly each display item in track 5 can be identified by the decimal number which corresponds to its position on the track. For example, if item 10004 is desired, as shown in FIG. 1, by selecting key 1 for the first track, key 0 for the next three tracks, then key 4 for the last track item 10004 will be reached and displayed.

In addition to the numbered buttons 0 . . . 9, the keyboard has also some special function keys which will now be described. For example, key 41 has the following function: If the operator elects at any level to advance one frame, he presses this key, which activates a single flip-flop 25, which opens gate 29 and advances the tape 10 until one mark has been passed; then it closes gate 29 to stop the motor 35, to enable the next active frame on that particular track to be read.

Pressing key 43 enables the operator to look at the immediately preceding active frame, i.e., the frame which has a display associated with it. This again actuates a single flip-flop 27, and as soon as this flip-flop is actuated, reversing switch 37 is closed, and reverses the motor 35, and gate 29 is opened until the next code marker on the tape is reached, i.e., the last preceding one, which closes gate 29 and stops the tape at that point, displaying the last previous active frame. The flip-flop 25 and reversing switch 37, together with the gate 29 and associated circuitry comprising the key switch 41 thus constitute a means to shift the ribbon 10 from one area of display information disposed at a retrieval means, to an adjoining area of display information on the same track. A reverse shifting of the ribbon 10 is effected by a similar means comprising the flip-flop 27 and key switch 43, together with the gate 29 and associated circuitry.

Key 49 permits the operator to scan at low speed and in succession a series of adjacent categories at any level, i.e., any track on the tape. This key activates a staircase generator 33 which periodically opens gate 31, and hence opens gate 29 for a short time interval, thereby actuating motor 35 to advance the ribbon 10 only to the location of the next (higher numbered) code marler and corresponding display image on the tape, after which the gate 31 is again closed for several seconds until the staricase generator produces the next cycle. In this manner, a successive scan of displays (of the same sub-category) may be automatically viewed for a period of several seconds each, one after another.

Key 47 is used to stop the staircase generator at any time if the operator sees a category which he desires to explore more thoroughly. Otherwise the staircase generator goes through the pre-selected number of frames, e.g., 10. Key 47 closes gate 31 which in turn closes gate 29.

Key 45 is a rewind button, which closes the reverse switch 37 through gate 50. At the same time a signal from key 45 opens gate 29, which starts the motor 35 running. When the tape has returned to its starting point, a special pulse is emitted through head a, which pulse is shown at 52, and which stops the motor.

Pushbutton 46 is a special reverse button which returns the tape to the preceding frame of the last preceding category. This is convenient when the operator wants to re-examine the display again from whcih he had selected the next category. When the operator presses button 46, gate 50 opens, activating reverse switch 37. At the same time, a signal is fed into the gate selector 22 (on line 32) which activates the gate selector 22 in reverse, closing the previously open gate 11 . . . 19, and opening the adjacent gate corresponding to the next track. For instance, if gate 15 was open and pushbutton 46 is depressed, gate 17 will remain closed, and gate 13 will be opened. An additional signal is fed into the 1 input of counter 23, which opens gate 29 and starts the motor running. When the activated head records the next pulse, the counter sends a signal through line 28, closing gate 29 and stopping the motor.

The foregoing sequence of operations initiated by the push-button 46 thus comprises a means for actuating the selector means 22 to de-activate a selected part of the retrieval means and automatically activate an adjoining part of the retrieval means, thereby to retrieve data from another portion of the ribbon 10.

Another embodiment of the invention which at present is to be considered the preferred embodiment is illustrated in FIG. 12, in which the retrieval means 34 comprises tape reading heads 1*a*, 3*a*, 5*a*, 7*a*, 9*a* which are adapted to be traversed by and to coact with a small side edge area of the video ribbon 10*a*, an enlarged representation of which is shown in FIG. 13. In addition, the retrieval means 34 includes a helical scan reading head 39*a*, which is used to retrieve the video information from a much wider adjoining portion of the ribbon 10*a*. The arrangement of video information or data and code marker information or data on the tape 10*a* shown in FIG. 13 will now be discussed. FIG. 13 also shows a retrieval means 34 comprising the helical scan reading head 39*a*, and reading heads 1*a* – 9*a*. Optionally, the Main Index Image of FIG. 4 may be located on the tape 10*a* in the position generally designated 62, corresponding to the "END" code markers 52*a*, which indicate the initial or starting position of the ribbon 10*a*. The video data contined in the 10 sub-categories of the Main Index Image are located in positions designated 64, (only two of the 10 positions are shown for clarity), and have code markers 65 in alignment therewith and in alignment with reading head 1*a*. In a similar manner, the positions of the video data of two of the next 100 images of the follow sub-categories of index image information are designated 66 and have code markers 67 in alignment with and adapted to be read by head 3*a*.

The video information of the following two sub-categories is arranged on the tape 10*a* in a similar fashion, each image having a corresponding code marker in alignment with and adapted to be read by the respective reading head 5*a* or 7*a*. The last sub-category of images 72 are object images, and have code markers 73 which are in alignment with the reading head 9*a* and are adapted to be read thereby.

The operation of this embodiment of the invention is very similar to the previous embodiment illustrated in FIG. 10. The difference between the two lies in the arrangement of the video data and code marker information on the video ribbon, and in the retrieval means. In the present preferred embodiment of FIG. 12, a separate helical scan head 39a is employed to retrieve only the video display information from the tape, (in both the Main Index and all sub-categories thereof) said information occupying the portions of the tape 10*a* in the areas designated 62, 64, 66 . . . 72 in FIG. 13. The code markers 52*a*, 65, 67 . . . 73, identify the respective locations on the tape of various portions of the video display data. The code markers (52*a*, 65) of the Main Index Image and first ten sub-categories thereof are read by head 1*a*. The code markers corresponding to the next 100 sub-categories (67) are read by the head 3*a*, and so on, the last sub-category code markers (73) being read by head 9*a*.

It is to be noted that in FIG. 12, the gates 11*a* . . . 19*a* need not be linear gates as those illustrated in FIG. 11, but instead may be simple logic "AND" gates, since in the present embodiment, the gates 11*a* . . . 19*a* when open are carrying only digital signals (pulses generated from the code markers on the ribbon) and need not carry any of the video display information. The video display information for all categories and sub-categories is retrieved by helical scan head 39*a*, which information may be carried along line 40 and through amplifier 57 for display on the viewing screen 2. The output signals from the gates 11*a* . . . 19*a* may be fed directly into the counter 23 with no further processing thereof. Gates 11*a* . . . 19*a* are controlled in the same manner by the selector means 22, i.e., they become energized one at a time in succession beginning with gate 11*a*, in response to insertion of the cassette into the tape unit 4, and actuation of one of the movable members 21*a* of the operator 21 by the user.

Still another type of arrangement of video display data and code markers is illustrated in FIG. 14. The portion of the ribbon 10b containing the Main Index Image is designated 62*b*, with its associated code marker 52*b* (the "END" marker) immediately preceding it. The video display data corresponding to the first 10 sub-categories is designated 64*b*, with the corresponding code markers 65*b* associated therewith disposed immediately to the left of each area of data. The code markers 65*b* are in alignment with the reading head 1*b* of a retrieval means 36, and are adapted to be read thereby as the ribbon 10*b* traverses the head. The video display data is retrieved by the helical scan head 39*b* of the retrieval means. Similarly, the video display data corresponding to the next succeeding 100 sub-categories is designated 66*b*, and the code markers 67*b* corresponding thereto are adapted to be read by head 3*b* and so on, for the next two series of sub-categories. Finally, the video display data of the last series of sub-categories (i.e., the video data containing the object images) is designated 72*b*, with the code markers 73*b* corresponding thereto as shown in FIG. 14, the code markers 73*b* being in alignment with head 9*b* and adapted to be read thereby as the tape is traversed.

Yet another type of arrangement of video display data and code markers is illustrated in FIG. 15. The portion of ribbon containing the Main Index Image is designated 62*c*, and has a code marker 52*c* contained within the video display data as shown. (In this case, as in preceding cases, the code marker corresponding to and locating the Main Index Image may be the same "END" marker 52*c* which identifies the initial or starting position pf the tape 10*c*.) The video display data corresponding to the first 10 subcategories is designated 64*c*, with the corresponding code markers 65*c* associated therewith being contained within each area of display data respectively. The code markers 65*c* are in alignment with the reading head 1c of the retrieval means 38 and are adapted to be read thereby as the ribbon 10*c* is traversed by the head. As before, the video display data is retrieved by the helical scan head 39*c* of the retrieval mans 38. Similarly, the video display data corresponding to the next succeeding 100 sub-categories is designated 66*c*, and has associated code marker 67*c*, adapted to be read by head 3*c*, and so on for the next two series of subcategories. The video display data of the last series of subcategories (object images) is designated 72*c*, and has associated code markers 73*c* located within the area of the display data, said code markers being adapted to be read by tape head 9*c* as the tape traverses the head.

In FIG. 12, there is also illustrated a connector plug 74 and cable 75 carrying 16 pairs of leads which are connected respectively across the contacts of the switches represented by each of the blocks of the manual operator 21, so as to enable the identical functions of the operator 21 to be duplicated by an external controlling device such as a computer, tape reader, or the like (not shown) by simply electrically short-circuiting the respective contact pairs which correspond to the particular function or digit desired. In this manner the user is not limited to controlling the system by solely manual operation. Instead a number of other types of operators, both manual and automatic, are useable by such an arrangement.

While the invention is described as employing both index aNd object images (Main Index plus four sub-categories of index images plus one sub-category of object images), the cassette may be employed for storage and retrieval of object images only, which would be advantageous in the use where it is desired to be able to store and retrieve a very large number of object images. In such a case, the pertinent index information can be contained separately, such as being listed on index cards or the like. Thus, a high degree of flexibility in the arrangement of the data to be stored and retrieved may be achieved, by the present invention.

From the foregoing it will be seen that the invention also embraces a novel method of image retrieval which includes the steps of activating a conversion means to display on the viewing screen the data from one portion of the ribbon, moving the ribbon to advance it with respect to the retrieval means, counting the pulses delivered by one part of said retrieval means, halting the ribbon after a predetermined number of pulses has been counted, displaying on the screen the data provided by the halted ribbon, activating another conversion means after said halting of the ribbon, moving the ribbon again to advance it with respect to the associated retrieval means, counting the pulses delivered by another part of said retrieval means, halting the ribbon after a predetermined number of pulses has been delivered by said other part of the retrieval means, and thereafter displaying on the screen data provided by the halted ribbon, in response to activation of the last-named conversion means.

Variations and modifications are possible without departing from the spirit of the invention.

I claim:

1. In the method of retrieving and displaying on a screen a video image from a catalog system which has a video ribbon containing video display information, and provided with a plurality of code markers disposed in predetermined relation with said information, said display information constituting separate but related categories and sub-categories of data, said system further having a video retrieval means comprising a plurality of parts and adapted to be traversed by and coact with said ribbon to retrieve information therefrom and produce pulses from the code markers thereof, and said system additionally having a viewing screen and a plurality of conversion means connected respectively to the parts Of said retrieval means for selectively displaying on said screen information retrieved by said retrieval means, the steps of:

a. moving the ribbon to advance it with respect to the retrieval means,
b. counting the pulses delivered by one part of said retrieval means,
c. halting the ribbon after a predetermined number of pulses have been counted,
d. activating another conversion means after said halting of the ribbon,
e. moving the ribbon again to advance it with respect to the retrieval means,
f. counting the pulses delivered by another part of said retrieval means,
g. halting the ribbon after a predetermined number of pulses has been delivered by said other part of the retrieval means, and
h. displaying on the screen information provided by the halting ribbon, in response to activation of the last-named conversion means.

2. The method as set forth in claim 1 and including the further steps of:

a. activating one of said conversion means, prior to the initial movement of the ribbon, so as to display on the screen the data from one portion of the ribbon, and
b. displaying on the screen, after the first halting of the ribbon, data provided by said halted ribbon.

3. An image retrieval system for locating and displaying any selected image stored on a record tape, comprising in combination:

a. a record tape on which are arranged the images to be displayed in a definite number of main categories and sub-categories, each main category and all of its associated subcategories having a specific location on the tape corresponding to a numerical order of magnitude, and being identified by a character assigned to each of said categories in serial order, a record mark located on said tape at the beginning of the location of each main category, said mark corresponding to and being identified by one of said characters, the categories being arranged on the tape in serial order, said tape having a number of identifiable locations, one for each main category with sub-locations within each location for sub-categories, the record marks for the respective main categories being stored on the first ones of said locations,
b. each of said main categories being subdivided into a number of sub-categories corresponding to a next lower order of subject matter, each sub-category having a character assigned thereto and being identified by a single record mark at the beginning of its location, the sub-categories at each main category being arranged on the tape in serial order,
c. means subdividing each of said sub-categories similarly to step b) into sub-sub-categories each identified by a single record mark,
d. a keyboard device having keys corresponding to the characters identifying each of said main categories and sub-categories thereof,
e. a counter device actuated by operation of a single key of said keyboard device and connected to a record sensing device,
f. means for running the tape forward and counting the number of record marks in said main category corresponding to the first single keyboard character which is actuated, and for stopping the tape when the location corresponding to the character on said first actuated key is reached,
g. means responsive to subsequent actuations of said keyboard device to shift the counting operation to the first sub-category and count the number of record marks in the first sub-category from the point at which the tape was stopped, and to stop when the character corresponding to said second actuation is reached, and shift the counting operation to a subsub-category upon the following successive actuation of said keyboard device for similarly counting the number of record marks in said sub-sub-category correspnding to the character of the key which has been actuated, and h. means for successively displaying those images on the tape at the locations corresponding to respective characters on the keys which have been actuated.

4. The invention according to claim 3, and further including reverse stepping means for running the tape backwards and for stopping the tape when the next single record mark in the reverse direction is reached, and a separate key on said keyboard device for actuating said reverse stepping means.

5. The invention according to claim 3, wherein said tape is a multi-track tape, the main category, the subcategories and the sub-sub-categories each being on a separate track of the tape, and further including a separate record sensing head for each of said tracks, said counter device comprising a stepping counter for counting record marks sensed by said heads, and means for successively and selectively connecting said heads with said stepping counter and for resetting the stepping counter to zero when the record mark corresponding to the character on the actuated key of the keyboard device is reached.

6. The invention according to claim 3, and further including means for displaying an index of the category subjects listed in the next sub-category along with their identifying associated characters each time a desired record mark on a given rack is reached, so that the operator can determine which unit of the next subcategory is appropriate to identify the desired subject matter.

7. An image retrieval system for locating and displaying any selected image stored on a record tape, comprising in combination:

a. a record tape on which are arranged the images to be displayed in a definite number of main categories, each category having a specific location on the tape corresponding to a decimal order of magnitude, and having a decimal digit assigned to each of said categories in serial order, a record mark located on said tape at the beginning of the location of each category, the categories being serially arranged on the tape, said tape having a number of tracks, the record marks for the respective main categories being stored on the first of said tracks, b. each of said main categories being subdivided into a number of sub-categories corresponding to a next lower order of magnitude, the sub-categories of the main categories each being identified by a record mark at the beginning of its location, a decimal digit corresponding to each record mark of the subcategory, the record marks for said sub-categories being stored in the second of said tracks, c. means subdividing each of said sub-categories into sub-sub-categories, each being identified by a record mark, a decimal digit corresponding to each record mark of the sub-sub-category, the record marks for each sub-subcategory being stored in the third of said tracks.

d. a keyboard device having keys for each decimal digit corresponding to the decimal numbers of said main category, of said sub-categories and of said sub-sub-categories, e. a counter device actuated by operation of a single key of said keyboard device and connected to a record sensing device, f. means for running the tape forward and counting the number of record marks in said first track corresponding to the single keyboard number which has been actuated, and for stopping the tape when said number is reached, g. means responsive to the second actuation of said keyboard device to shift the counting operation to the second track of said tape, to count the number of record marks in the second track from the point at which the tape was stopped, and to stop the tape when the number corresponding to said second actuation is reached, and h. means for shifting the counting operation to the third track upon the third actuation of said keyboard device for similarly counting the number of record marks on the third track in response to the third actuation of the keyboard, until the last track is reached, and i. means for successively displaying those images on the tape at the locations corresponding to respective digits on the keys which have been actuated.

8. The invention according to claim 7, and further including reverse stepping means for running the tape backwards and for stopping the tape when the next record mark in the reverse direction is reached, and a separate key on said keyboard device for actuating said reverse stepping means.

9. The invention according to claim 7, and further including a separate record sensing head for each of said tracks, said counter device comprising a stepping counter for counting record marks sensed by said heads, and means for successively and selectively connecting said heads with said stepping counter and for resetting the stepping counter to zero when the record mark corresponding to the number of the actuated key of the keyboard device is reached.

10. The invention according to claim 7, and further including means for displaying an index of the subjects listed in the next subcategory along with their identifying associated digits each time a desired record mark on a given track is reached, so that the operator can determine which digit of the next subcategory is appropriate to identify the desired subject matter.

11. A video image retrieval catalog system comprig-ing, in combination:

a. a video ribbon having video display information, said ribbon comprising a plurality of co-extensive tracks and a plurality of code markers for each track disposed along said ribbon in predetermined relation with said information, b. said display information being in units which are related respectively to individual code markers and constituting not only separate but also related categories and sub-categories of data, c. a plural-part video retrieval means comprising a plurality of scanning heads disposed in a row in juxtaposed relation adapted to be traversed by and coact with said ribbon, said means being arranged to retrieve data therefrom and produce pulses from the code markers thereof, d. a viewing screen, e. a plurality of conversion means connected respectively to the parts of said retrieval means for selectively displaying on said screen data retrieved by said retrieval means, f. selector means controlling said conversion means, whereby selected data from the ribbon can be displayed on said screen, g. an operator having a plurality of movable members arranged for selective actuation, h. means including a pulse counter, connecting said operator with said selector means for selectively actuating the latter, i. means connected with the counter and being under the control of said movable members, for rendering operative the counter to totalize code marker pulses picked up by said retrieval means, j. powered drive means for advancing said ribbon, k. control means for activating said drive means in response to operation of said counter, said control means being responsive to traversal of the retrieval means by a predetermined number of code markers on said ribbon, and for automatically halting said ribbon after a predetermined extent of travel corresponding to the counting of said predetermined number of code markers.

12. A catalog system as in claim 11, wherein:

a. said operator comprises a keyboard, b. said movable members comprise keys on said board, and c. said connecting means comprises switches actuated by said keys.

13. A catalog system as in claim 11, and further including:

a. means carried by said operator and including a movable member, for actuating said selector means to de-activate a selected part of the retrieval means, and for automatically activating another part of the retrieval means, thereby to retrieve data from another portion of the ribbon.

14. A catalog system as in claim 11, and further including:

a. means carried by said operator and including a movable member, for actuating said control means to shift said ribbon from one area of display data disposed at one part of the retrieval means, to an adjoining area of display data on the ribbon.

* * * * *